Dec. 7, 1926.

M. B. WOOD 1,609,925

INCLOSED ELECTRIC SWITCHBOARD

Filed Dec. 11, 1924       3 Sheets-Sheet 1

Inventor.
Morris B. Wood
by
atty

Dec. 7, 1926.

M. B. WOOD 1,609,925

INCLOSED ELECTRIC SWITCHBOARD

Filed Dec. 11, 1924    3 Sheets-Sheet 2

Inventor,
Morris B. Wood
by
[signature]
atty

Dec. 7, 1926.                                                              1,609,925
                              M. B. WOOD
                      INCLOSED ELECTRIC SWITCHBOARD
                   Filed Dec. 11, 1924        3 Sheets-Sheet 3

Inventor.
Morris B. Wood

Patented Dec. 7, 1926.                                                          1,609,925

UNITED STATES PATENT OFFICE.

MORRIS B. WOOD, OF SOMERVILLE, MASSACHUSETTS, ASSIGNOR, BY MESNE ASSIGN-
MENTS, TO CONDIT ELECTRICAL MANUFACTURING CORPORATION, OF BOSTON, MAS-
SACHUSETTS, A CORPORATION OF MASSACHUSETTS.

INCLOSED ELECTRIC SWITCHBOARD.

Application filed December 11, 1924. Serial No. 755,325.

This invention relates to shutters for inclosed switch boards of the removable truck type.

An inclosed switch board of the removable truck type comprises essentially an inclosing housing adapted to contain the fixed circuit conductors, or bus bars, and the electric switches, usually of the oil-immersed type, and accessory apparatus. The switches, and some associated apparatus, are usually mounted on trucks which carry a panel section of the switch board; and the panel sections cooperate to form a closure for the switch board housing when the trucks are in service position. Connection between the truck-supported switches and fixed circuit conductors is established through disconnecting switches having their movable contact members carried by the truck and their stationary contact members disposed within the rear part of the housing and fixed in such position. This construction is advantageous in that the circuit leads and apparatus are isolated within the housing and when a truck is removed from its compartment within the housing the switch and accessory apparatus carried thereby is electrically disconnected from the circuit and can be worked upon with safety.

It is often desirable for an operative to enter a truck compartment and, to protect the operative against contact with the fixed members of the disconnecting switch, or other live conductors, a shutter is disposed within the compartment to cover the fixed members of the disconnecting switch and live conductors.

Ordinarily the shutter is operated automatically by the movement of the truck and is so arranged that when the truck is moved out of its compartment the shutter is caused to drop by its weight into a covering or shielding position in front of the stationary members of the disconnecting switch and to be raised to uncover said members when the truck is moved into its compartment. It sometimes happens that this type of shutter is accidentally held in raised position by friction, after the truck has been removed, and thereby fails to provide the protection desired.

It is an object of this invention to provide an inclosed switch board of the removable type with a shutter for isolating the stationary terminals of the disconnecting switch and other fixed live conductors in the truck compartment and with operating means for the shutter so arranged and interconnected with the truck that the operative is compelled manually to lower the shutter into isolating position before he can remove the truck entirely from its compartment; and also is compelled to raise the shutter to an inoperative position before he can move the truck entirely into its compartment and connect the switch with its line.

A switch board thus arranged provides that either the shutter or the truck itself is positively interposed between the live conductors and an operative.

A further object is generally to improve the construction and operation of switch boards and apparatus accessory thereto.

Fig. 8 is a detail illustrating the manner of yieldingly mounting the roller of the shutter operating mechanism.

Fig. 9 is a perspective detail illustrating more particulray the supporting means for the roller.

Fig. 10 is a perspective detail of a guide plate for the roller support.

Figure 1:
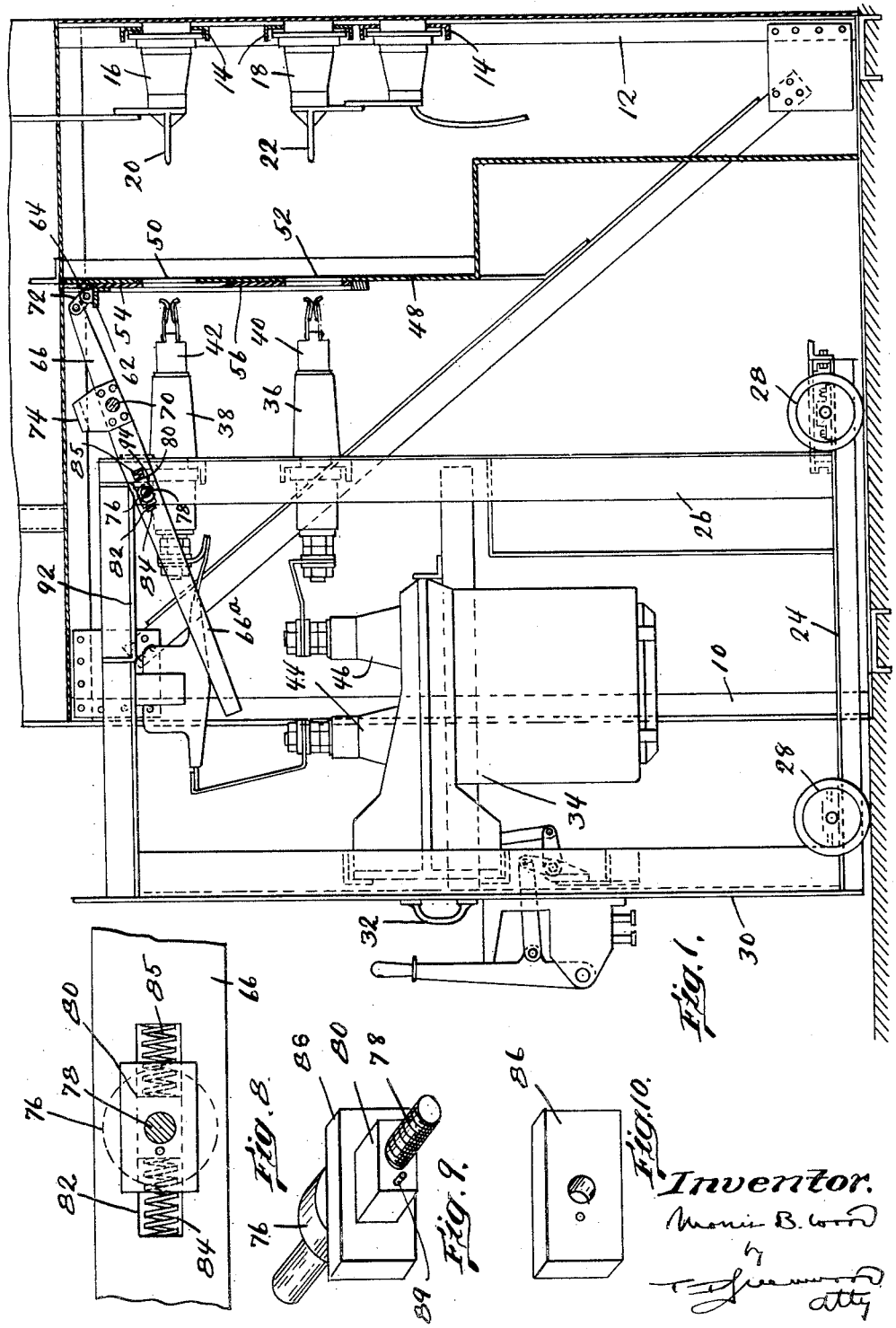
Fig. 1 is a side sectional elevation of an inclosed switch board and a removable truck unit with its associated mechanism and with the truck partially withdrawn from the switch board housing.

As here shown, the inclosed switch board embodying the invention includes a housing formed of the front uprights 10 and rear uprights 12 with suitable plates attached to said housing to inclose the space therein. Cross members 14 may be disposed within said housing adjacent the rear wall thereof and insulators 16 and 18 may be carried by said cross members 14. Stationary contact members 20 and 22 may be carried by said insulators and comprise the fixed contact members of a disconnecting switch. The removable truck includes spaced members 24 and uprights 26 which form a frame adapted to support the oil switch and accessory apparatus. The truck is mounted on supporting wheels 28 by which the truck may be moved into and withdrawn from its inclosing compartment in the switch board. A vertical panel 30 is carried by the truck on the forward face thereof and, when the truck is in service position within the switchboard, said panel forms the closure for the truck compartment. Handles 32 may be provided by which the truck may be conveniently manipulated. An electric switch 34 here shown as of the oil-immersed type, is carried by the truck frame in the rear of said panel 30.

Figure 2:
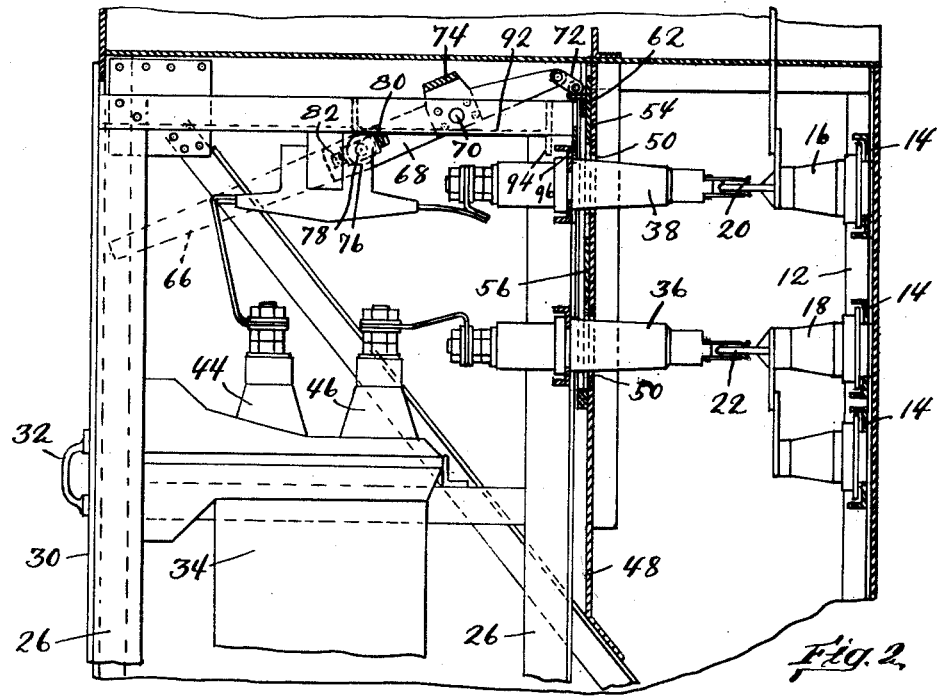
Fig. 2 is a detail similar to Fig. 1 but showing the truck in service position within the housing.
Figure 6:
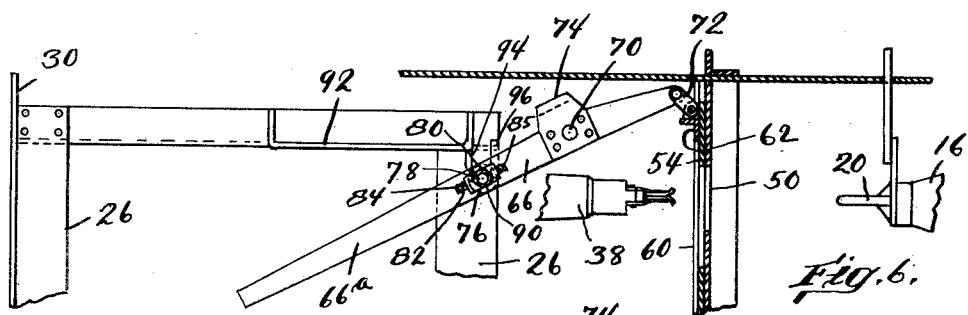
Fig. 6 is a side elevation in detail and illustrating diagrammatically the relative disposition of the shutter operating mechanism in a condition to permit the shutter to be lowered manually and release the truck for complete withdrawing movement.

Insulating bushings 36 and 38, here shown as vertically-aligned, are carried by the truck frame and are disposed in approximate horizontal alignment with the stationary contact members 20 and 22 of the disconnecting switch. Said insulating bushings 36 and 38 are provided with contact members 40 and 42 at their rear ends and said contact members are suitably connected electrically with the terminals 44 and 46 of the oil switch and form the movable contact members of the disconnecting switch. As thus arranged when said truck is in service position within its compartment, as shown in Fig. 2, said movable contact members 40 and 42 are adapted to engage the fixed contact members 20 and 22 of the disconnecting switch. When, however, the truck is withdrawn said contact members are separated thereby disconnecting the oil switch from the circuit.

The stationary contact members of the disconnecting switch, and also the circuit conductors, are usually isolated from the truck compartment by means including a vertical plate 48, which plate is disposed in spaced relation in front of said stationary contact members 20 and 22 and is provided with apertures 50 and 52 through which the insulators 36 and 38 carried by the truck may be extended whereby to make contact with said stationary contact members.

In accordance with this invention, a shutter is provided which is arranged to be moved into a position to cover said apertures 50 and 52 before the truck is finally completely withdrawn from its compartment; and also to be raised to uncover said apertures before the truck is completely moved into its service position within its compartment. The shutter includes a pair of vertically spaced plates 54 and 56 secured in spaced relation by the bars 58 in such a manner that, when the shutter is lowered, said upper plate 54 is disposed to cover the series of upper apertures 50 and said lower plate 56 is disposed to cover the lower series of apertures 52. When the shutter is raised said lower plate 56 is adapted to be disposed between the two rows of apertures and expose both rows of apertures. The lateral edges of said plates 54 and 56 are received in vertically-disposed grooved tracks 60 carried by the forward face of the partition plate 48; and the shutter is disposed freely to slide in said tracks. A bar 62 may be secured to said upper plate 54 and extended horizontally on both sides of said plate and also forwardly thereof; and the extended ends of said bar may be formed or provided with vertical lugs 64 for connection with the shutter operating mechanism.

The shutter operating mechanism includes two levers 66 and 68, which levers are disposed on opposite sides of the truck frame at the upper portion thereof and are pivoted intermediate their ends by pins 70 to the switch board housing. The rear ends of said levers are loosely connected through links 72 with lugs 64 of the shutter so that a reciprocatory movement of said levers raises and lowers said shutter. Said two levers are connected readily together by the cross bar 74. One of said levers, as the lever 66, is extended forwardly and is provided with a handle portion 66ᵃ which is terminated adjacent the opening to the truck compartment in a position in which it may readily be grasped and manipulated by an operative when the truck is partially withdrawn from its compartment. Both of said levers 66 and 68 are preferably provided with means releasingly to interconnect the truck and shutter whereby the movement of the truck may be governed by the position of the shutter, although so far as this invention is concerned it is sufficient if but one of said levers as, for instance, the lever 66 is provided with such means.

The truck interconnecting means includes a roller 76 which is journalled on a shaft 78. Said shaft 78 is carried by a slide block 80, which block is slidable within a slot 82 formed in the lever 66. Said slot is disposed to lie along the length of said lever and said block is maintained yieldingly in mid position in said slot by means of the spiral compression springs 84 and 85, which springs are disposed on opposite sides of said block and are adapted to bear against the end walls of said slot and also against the opposite faces of the block. Means are provided to retain said block in position in the slot and said means may comprise guide plates 86, which plates are disposed upon said shaft 78, on opposite sides of the lever. Said plates may be rotatably fixed to said block by means including the pins 89, one of which is shown in Fig. 9, which pins are adapted to enter corresponding recesses in the plates. A nut 90 may be screw-threaded on said shaft whereby to hold said plates and block in the aforesaid relation.

The upper portion of the truck frame is formed or provided with a cam plate 92, which plate is extended laterally from the body of the truck frame and is disposed to bear against said roller 76 during a predetermined extent of movement of the truck frame. Said truck frame is also provided with a depending lug 94 at the rear end of the cam plate 92, which lug is adapted, in a withdrawing movement of the truck frame, to bear against said roller and serve as a stop to prevent further withdrawing movement of the truck. A second lug 96 may be disposed in spaced relation with and in the rear of said first lug 94 to serve as a second stop member; and the space between said two lugs or stop members is adapted to be sufficient to permit the roller to pass upwardly and downwardly therebetween.

When the truck is in its service position within its compartment in the switch board, the shutter is maintained in raised position by the engagement of said roller 76 with the lower face of said cam plate 92. When the truck is moved outwardly said plate 92 passes over said roller until said roller engages with the stop member 94, and the roller and its support is moved forwardly in the slot and compresses the forward spring 84 whereupon further withdrawing movement of the truck is prevented. The operative is now constrained to actuate the shutter operating lever to close the shutter, before the truck can be unlocked and be completely withdrawn from its compartment. To this end, the operative depresses the handle portion 66ª of the handle 66 and thereby moves the roller 76 downwardly to a position below the bottom edge of the first forward stop member 94. Due to the action of the compressed forward spring 84, the roller is moved rearwardly to its midposition in its slot, in which position it is disposed in line with, and below, the space between the two stop members 94 and 96. The forward end of the lever 66 is thereupon moved upwardly, or it may be merely released, and the weight of the shutter will move the lever upwardly, thereby causing the shutter to descend and isolate the live parts of the disconnecting switch from the truck compartments. At the same time, the roller 76 passes upwardly above the rear stop member 96 and clears all projecting parts of the truck. The truck may then be withdrawn and an operative may safely enter the truck compartment.

Figure 7:
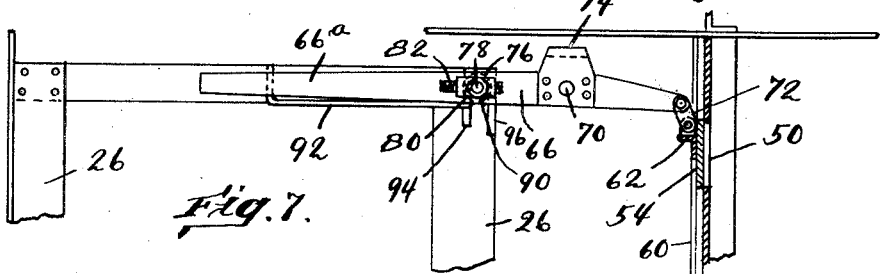
Fig. 7 is a view similar to Fig. 6 but with the shutter lowered and with the truck released for further withdrawing movement.
Figure 4:
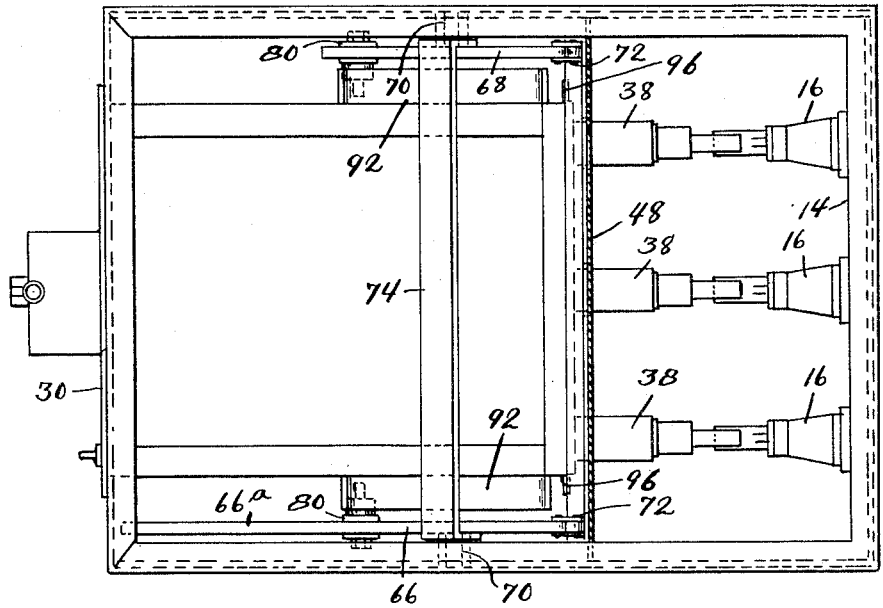
Fig. 4 is a plan view of Fig. 2 and showing more particularly the shutter operating mechanism.
Figure 3:
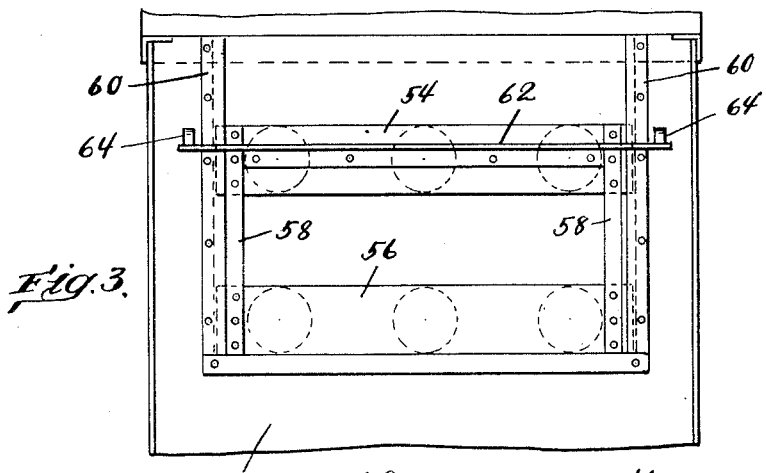
Fig. 3 is an elevation in detail of the shutter.
Figure 5:
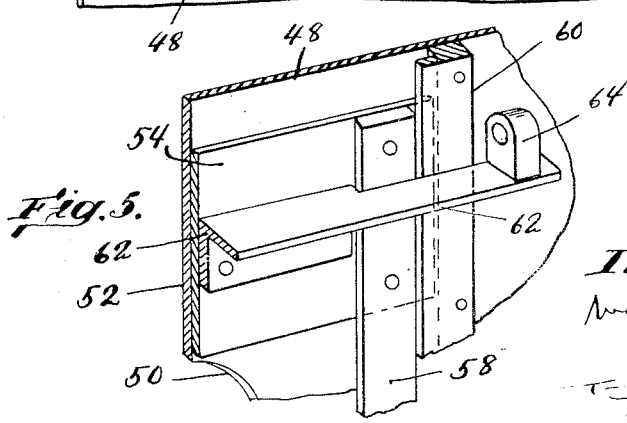
Fig. 5 is a perspective detail illustrating the manner of connecting the shutter with its operating mechanism.

When the truck is moved into its compartment, its movement is arrested in an intermediate position by the engagement of a projection 94 with the roller 76, as illustrated in Fig. 7 and the rearmost spring 85 is compressed. The operative is then constrained to move the handle 66ª downwardly thereby positively raising the shutter. When the shutter is in its raised position the parts are so arranged that the roller 76 passes beneath the lower edge of the forward stop member 94 and, due to the spring 82, is forced forwardly of said stop members into a position to ride upon the bottom face of the cam plate 92, whereupon the truck may be moved completely into its service position and into electrical engagement with the circuit conductors.

From the construction above described, it is apparent that the truck can not be withdrawn completely from its compartment until the shutter has been closed and, also, that the truck can not be moved completely into its compartment until the shutter has been opened.

The construction may be otherwise modified without departing from the spirit of the invention.

I claim:

1. An inclosed switchboard having a truck compartment and a conductor compartment, a shutter controlling communication between said compartments and movable between open and closed positions, a truck movable in and out of said truck compartment, and shutter operating mechanism having means interlocking it with said truck to restrict the movement of said truck.

2. An inclosed switchboard having a truck compartment and a conductor compartment, a shutter controlling communication between said compartments and movable between open and closed positions, a truck movable in and out of said truck compartment, and shutter operating mechanism having means normally restraining said truck within its compartment.

3. An inclosed switchboard having a truck compartment and a conductor compartment, a shutter controlling communication between said compartments and movable between open and closed positions, a truck movable in and out of said truck compartment, and shutter operating mechanism having means arranged to hold the truck from complete withdrawal from its compartment when the shutter is in open position.

4. An inclosed switchboard having a truck compartment and a conductor compartment, a shutter controlling communication between said compartments and movable between open and closed positions, a truck movable in and out of said truck compartment, shutter operating mechanism having means arranged to hold the truck from complete withdrawal from its compartment when the shutter is in open position and release said truck when the shutter is in closed position.

5. An inclosed switchboard having a truck compartment and a conductor compartment, a shutter controlling communication between said compartments and movable between open and closed positions, a truck movable in and out of said truck compartment, and shutter operating mechanism having means engageable with the truck and arranged to hold the truck from inward movement within its compartment when the shutter is in closed position.

6. An inclosed switchboard having a truck compartment and a conductor compartment, a shutter controlling communication between said compartments and movable between open and closed positions, a truck movable in and out of said truck compartment, and shutter operating mechanism having means engageable with the truck and arranged to hold the truck from inward movement within its compartment when the shutter is in closed position and release said truck when the shutter is in open position.

7. An inclosed switchboard having a truck compartment and a conductor compartment, a shutter controlling communication between said compartments and movable between open and closed positions, a truck movable in and out of said truck compartment, and manually operable shutter-operating mechanism having means interlocking it with said truck and arranged normally to lock the truck within its compartment, said interlocking means also constructed and arranged to release said truck when the shutter is in closed position.

8. An inclosed switchboard having a truck compartment and a conductor compartment, a shutter controlling communication between said compartments and movable between open and closed positions, a truck movable in and out of said truck compartment, and manually-operable shutter-operating mechanism having means to prevent the complete movement of the truck from its compartment until the shutter is in closed position, and also to prevent complete movement of the truck into its compartment until the shutter is in open position.

9. An inclosed switchboard having a truck compartment and a conductor compartment, a shutter controlling communication between said compartments and movable between open and closed positions, a truck movable in and out of said truck compartment, and manually-operable shutter-operating mechanism having means to hold the truck in its compartment until the shutter is closed manually.

10. An inclosed switchboard having a truck compartment and a conductor compartment, a shutter controlling communication between said compartment and movable between open and closed positions, a truck movable in and out of said truck compartment, and manually-operable shutter-operating mechanism having means to hold the truck in its compartment until the shutter is closed manually, said means also constructed and arranged to hold the truck from complete movement into its compartment until the shutter has been opened manually.

11. An inclosed switchboard having a truck compartment and a conductor compartment, a shutter controlling communication between said compartments and movable between open and closed positions, a truck movable in and out of said truck compartment, means arranged normally to lock said truck against complete withdrawal from its compartment, and means to release said truck including means to close said shutter manually.

12. An inclosed switchboard having a truck compartment and a conductor compartment, a shutter controlling communication between said compartment and movable between open and closed positions, a truck movable in and out of said truck compartment, means arranged normally to lock said truck against complete movement into its compartment and means to release said truck for further inward movement including means to open said shutter manually.

13. An inclosed switchboard having a truck compartment and a conductor compartment, a shutter controlling communication between said compartments and movable between open and closed positions, a truck movable into and out of said truck compartment and arranged to close said compartment when completely within it, and shutter-operating mechanism including an operating handle disposed within said truck compartment in position to be accessible when the truck is partially withdrawn from said compartment.

14. An inclosed switchboard having a truck compartment and a conductor compartment, a shutter controlling communication between said compartments and movable between open and closed positions, a truck movable in and out of said truck compartment, and shutter operating mechanism including a manually-operable lever connected with said shutter and arranged to move it between open and closed positions, and means governed by the position of the truck within its compartment arranged to control the manual operation of said lever.

15. An inclosed switchboard having a truck compartment and a conductor compartment, a shutter controlling communication between said compartments and movable between open and closed positions, a truck movable in and out of said truck compartment, and shutter operating mechanism including means arranged normally to engage said truck when it is partially withdrawn from its compartment and hold it releasingly from further withdrawing movement, and means to release said truck-locking means and also to operate said shutter operating mechanism to close said shutter.

16. An inclosed switchboard having a truck compartment and a conductor compartment, a shutter controlling communication between said compartments and movable between open and closed positions, a truck movable in and out of said truck compartment, and shutter operating mechanism including a manually-operable pivoted lever connected with said shutter to move it between open and closed positions, means carried by said truck arranged to engage said lever and maintain said shutter in open position during a predetermined extent of movement of said truck from its compartment, other means carried by said truck arranged to engage said lever at the end of said extent of movement and arrest further withdrawing movement of said truck, said lever having means to effect its manual disengagement from said last-named means, whereby to release said truck for further withdrawing movement and permit the shutter to be moved into closed position.

17. An inclosed switchboard having a truck compartment and a conductor compartment, a shutter controlling communication between said compartments and movable between open and closed positions, a truck movable in and out of said truck compartment, and shutter operating mechanism including a manually-operable pivoted lever connected with said shutter to move it between open and closed positions, said lever having a lateral extension, a cam plate carried by said truck adapted to engage said extension and hold the shutter open, and a depending stop-member disposed at the rear end of said cam plate to engage said lateral extension and restrict the withdrawing movement of said truck from its compartment, said lever arranged to be depressed to move said lateral extension below and free from engagement with said stop-member, whereby to release said truck for further withdrawing movement and to permit said lever to be raised and the shutter closed.

18. An inclosed switchboard having a truck compartment and a conductor compartment, a shutter controlling communication between said compartments and movable between open and closed positions, a truck movable in and out of said truck compartment and shutter operating mechanism including a manually-operable pivoted lever connected with said shutter to move it between open and closed positions, said lever having a lateral extension, a cam plate carried by said truck adapted to engage said extension and hold the shutter open, and a depending stop-member disposed at the rear end of said cam plate to engage said lateral extension and restrict the withdrawing movement of said truck from its compartment, said lever arranged to be depressed to move said lateral extension below and free from engagement with said stop-member, whereby to release said truck for further withdrawing movement and to permit said lever to be raised and the shutter closed, and an upstanding stop-member disposed at the rear of said cam plate to engage with said lateral extension and restrict the inward movement of said truck.

19. An inclosed switchboard having a truck compartment and a conductor compartment, a shutter controlling communication between said compartments and movable between open and closed positions, a truck movable in and out of said truck compartment, and having a horizontally-disposed cam-plate provided with upstanding and depending stop-members at its rear end, and shutter operating mechanism including a manually-operable lever connected with said shutter, and means carried by said lever arranged to engage said cam-plate and depending stop-member when the truck is moved outwardly of its compartment, and engage said upstanding stop-member when the truck is moved inwardly in its compartment.

20. An inclosed switchboard having a truck compartment and conductor compartment, a shutter controlling communication between said compartments and movable between open and closed positions, a truck movable in and out of said truck compartment, and shutter-operating mechanism including a manually-operable pivoted lever connected with said shutter, a roller having a compressible yield-connection with said lever, a cam-plate carried by said truck adapted to engage said roller and maintain the shutter normally open, a depending stop-member carried by said truck and disposed in the rear of said cam-plate to engage said roller and compress its connection, said lever having provision for moving said roller below said stop-member.

21. An inclosed switchboard having a truck compartment and a conductor compartment, a shutter controlling communication between said compartments and movable between open and closed positions, a truck movable in and out of said truck compartment, and having a cam plate and a depending stop-member disposed at the rear end of said cam plate and a shutter operating lever having a lateral extension movable below said stop member and into and out of engagement with said cam-plate.

22. An inclosed switchboard having a truck compartment and a conductor compartment, a shutter controlling communication between said compartments and movable between open and closed positions, a truck movable in and out of said truck compartment, and having a cam plate and a depending stop-member disposed at the rear end of said cam-plate, and a shutter operating lever having a roller engageable with said cam-plate and stop member, a support for said roller slidable approximately horizontally in a slot in said lever, and springs arranged to maintain said support yieldingly in mid-position in said slot.

In testimony whereof, I have signed my name to this specification.

MORRIS B. WOOD.